(No Model.)
J. LANE.
VEHICLE WHEEL.
No. 278,665. Patented May 29, 1883.
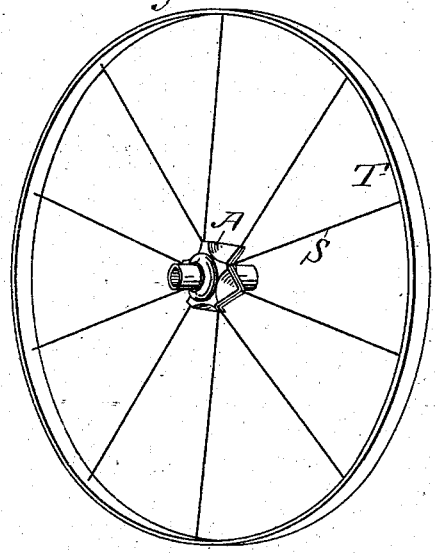
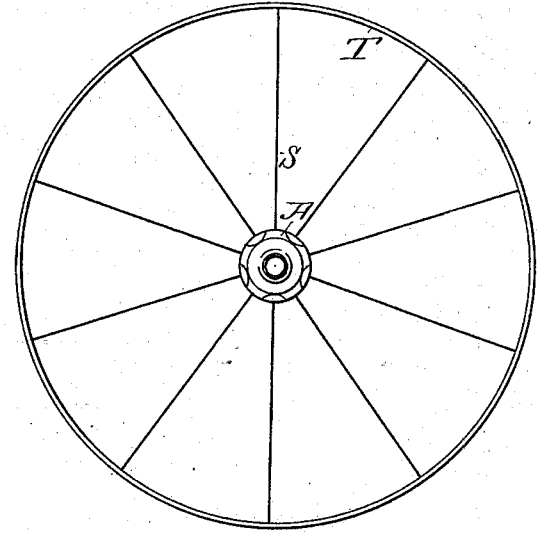
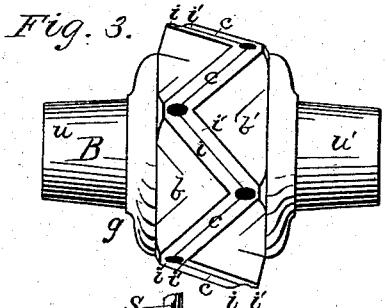
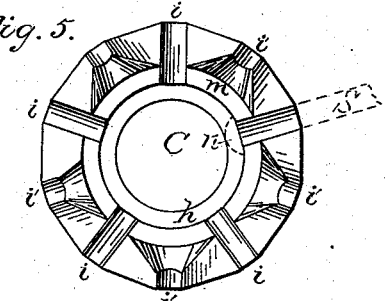
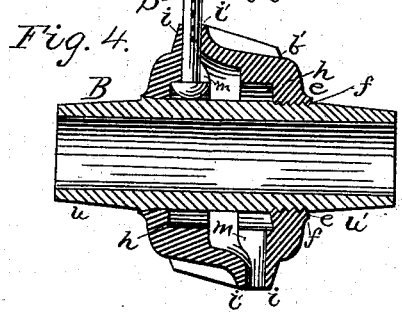
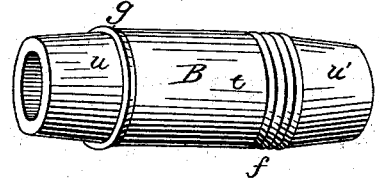
WITNESSES:
Geo. C. Wilson
Wm. B. Young
INVENTOR
John Lane

UNITED STATES PATENT OFFICE.

JOHN LANE, OF HYDE PARK, ILLINOIS.

VEHICLE-WHEEL.

SPECIFICATION forming part of Letters Patent No. 278,665, dated May 29, 1883.

Application filed March 2, 1883. (No model.)

*To all whom it may concern:*

Be it known that I, JOHN LANE, of Hyde Park, county of Cook, and State of Illinois, have invented certain Improvements in Vehicle-Wheels, of which the following is a specification.

The object of my invention is to provide a spoked metallic wheel for cultivators and other implements, which shall be at once light, cheap, durable, and strong, and which may be cheaply, quickly, and easily repaired, and specially providing for changing the box as it shall become worn by the placing of a new one, with light expense and without sending the wheel to a shop; and the invention consists in a new and improved construction of the hub.

Referring to the drawings, like letters refer to like parts.

Figure 1 is a perspective view of my improved wheel, and Fig. 2 is a plan or elevation of the wheel. Fig. 3 is a view, enlarged, of the hub; and Fig. 4 is a cross-section, enlarged, of the hub, taken on a line longitudinal through the hub. Fig. 5 is a view, enlarged, of the inner face of one of the two parts of the annular. Fig. 6 is a perspective view, enlarged, of the pipe-box.

In the drawings, A represents the hub of the wheel, S the spokes, and T the felly tire or rim.

The felly-tire may be constructed in the usual manner, and with spoke-holes, in which the spokes are inserted, as shown.

The spokes S may be constructed with a head on one end to be seated in the annular, and the other end may be constructed and inserted in the felly-tire in any usual manner. I prefer to construct the spokes and insert them in the felly-tire as is shown in my application for a patent now pending, filed February 19, 1883, and for which I do not herein make claim.

The hub A consists of an annular constructed of two disk-rings, $b$ $b'$, which have their meeting faces serrated, and which are united rigidly together by the pipe-box B, which said pipe-box is provided with a shoulder, $g$, seated in the disk-ring $b$, and a screw-threaded portion, $f$, seated in the disk-ring $b'$, as shown in the drawings. The disk-rings are constructed alike on their inner faces, and a description of one will suffice for both. They are so constructed that the spokes are seated zigzag therein in seats formed by the slots $i$ $i'$, and the meeting face or parting-line $c$ is serrated or zigzag about the annular, as shown in Fig. 3. A rim, $m$, is formed interior some distance below the periphery of the disk-ring, and slots $i$ extend through the said rim, making a deep slot therein, sufficient to admit the body of the spoke, and a recess is formed under the said rim, providing for supporting the head $n$ of the spoke S, and it will be noticed that the rim $m$ extends beyond the body of the spoke as a bracket for supporting the head $n$, and the outer end of the said head seated on the pipe-box, as shown in the drawings in Fig. 4. In Fig. 4 is shown the spoke S seated in the slot $i$, with the head $n$ in the recess $k$, supported by the rim $m$ and seated on the pipe-box, and in Fig. 5 is shown how the slots $i$ and $i'$ embrace the spoke when the two disk-rings are placed together. One of the disk-rings, $b'$, has its central perforation, C, screw-threaded, as shown at $e$ in Fig. 4.

The operation will be understood by inspecting the drawings, in which Fig. 4 shows the spoke S seated in the annular embraced by the two disk-rings, with the pipe-box having its shoulder seated against the disk-ring $b$ and screwed into the disk-ring $b'$, rigidly uniting the disk-rings together. It will be seen that the interior faces of the disk-rings are cored out or left hollow, in order to render the annular as light as possible.

I am aware that sectional metallic hubs have been made in many forms, and that spokes have been secured between collars clamped together. Such I do not broadly claim; but I am not aware that any one has hitherto constructed a hub in the peculiar manner represented in the drawings.

It is to be noted that in my wheel the spokes are intended and are arranged to receive a tensile instead of a thrusting strain, and yet such may be changed to a thrusting strain when the spokes are seated on the pipe-box, as shown in the drawings, without departing from my invention. The pipe-box is constructed cylindrical, having a central portion, $t$, which may be of even size, for supporting the annular, having a shoulder, $g$, at one end and the screw-thread $f$ on the other end, outside of which is projecting the extended portions $u$ and $u'$, which are alike in construction, and may be of reduced size and plain pipe without sand-caps, as shown in the drawings, providing for use on ordinary cultivators, and that the pipe-box may have a long bearing on the axle.

I am aware that it is not new in a pipe-box to be provided with a shoulder and screw-threaded. Such I do not broadly claim.

In the wheel shown are shown ten spokes, and it is obvious that more or less spokes may be used.

I claim—

1. The hub A, consisting of the annular, constructed of two disk-rings which have their meeting face serrated and with spoke-slots, substantially as shown, in combination with the pipe-box provided with a shoulder seated on one of the disk-rings, and a screw-threaded portion screwed into the other disk-ring, all arranged to operate substantially as and for the purpose set forth.

2. In a metallic hub, the disk-ring $b$, provided with an interior rim, $m$, slotted as shown, the recess $h$, formed under the said rim, and with slots $i$ and $i'$, set serrated or zigzag about the exterior or face of the ring, substantially as and for the purpose set forth.

3. The pipe-box B, consisting of a cylindrical pipe, with a central portion provided with a shoulder, $g$, at one end and a screw-thread, $f$, at the other end, and with extended portions $u$ and $u'$, of plain pipe, extending from either end of the central portion outside of the screw-thread and shoulder, as shown, and for the purpose set forth.

4. In a metallic hub, the disk-ring provided with an interior rim, slotted as shown, the recess formed under the said rim, and slots $i$, in combination with pipe-box, and with spokes provided with heads, the body of the spoke seated in the said slot, and the head $n$, seated on the pipe-box and supported by the said rim, substantially as and for the purpose set forth.

5. The combination of the annular composed of two disk-rings provided with spoke-seat slots on their inner or meeting face, spokes seated in and embraced by the said slots, and pipe-box provided with a shoulder seated on one of the disk-rings and a screw-threaded portion screwed into the other disk-ring, all substantially as and for the purpose set forth.

JOHN LANE.

Witnesses:
E. L. LANE,
GEO. C. WILSON.